United States Patent
Ishikawa et al.

(10) Patent No.: US 9,989,031 B2
(45) Date of Patent: Jun. 5, 2018

(54) ENGINE AUTOMATIC STOP/RESTART DEVICE

(71) Applicant: Mitsubishi Electric Corporation, Tokyo (JP)

(72) Inventors: Osamu Ishikawa, Tokyo (JP); Tomohisa Shoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 14/890,985

(22) PCT Filed: Sep. 10, 2013

(86) PCT No.: PCT/JP2013/074376
§ 371 (c)(1),
(2) Date: Nov. 13, 2015

(87) PCT Pub. No.: WO2015/037053
PCT Pub. Date: Mar. 19, 2015

(65) Prior Publication Data
US 2016/0115931 A1    Apr. 28, 2016

(51) Int. Cl.
*F02N 11/08*    (2006.01)
*F02N 11/00*    (2006.01)
*F02N 15/06*    (2006.01)

(52) U.S. Cl.
CPC ...... *F02N 11/0833* (2013.01); *F02N 11/0844* (2013.01); *F02N 11/00* (2013.01);
(Continued)

(58) Field of Classification Search
CPC ............. F02N 11/0844; F02N 11/0833; F02N 11/0818; F02N 11/0855
See application file for complete search history.

(56) References Cited

U.S. PATENT DOCUMENTS

| | | | | |
|---|---|---|---|---|
| 2011/0056450 A1* | 3/2011 | Notani | ................ | F02N 11/0855 123/179.4 |
| 2012/0035827 A1* | 2/2012 | Kuniyoshi | .......... | F02N 11/0855 701/102 |
| 2013/0289855 A1 | 10/2013 | Kitano et al. | | |

FOREIGN PATENT DOCUMENTS

CN    102374092 A    3/2012
GB    2468906 A    9/2010
(Continued)

OTHER PUBLICATIONS

Communication dated Jul. 26, 2016, from the Japanese Patent Office in counterpart application No. 2015-536309.
(Continued)

*Primary Examiner* — Hung Q Nguyen
*Assistant Examiner* — Xiao En Mo
(74) *Attorney, Agent, or Firm* — Sughrue Mion, PLLC; Richard C. Turner

(57) ABSTRACT

An engine automatic stop/restart device includes a ring gear which is linked to a crank shaft of the engine, a starter motor which is energized so as to be rotated, a pinion gear which transmits a rotation of the starter motor to the ring gear, and a pinion gear movement unit which is energized so as to move the pinion gear in a direction of the ring gear, whereby the pinion gear is engaged to the ring gear, in a state where the engine automatic stop/restart device automatically stops the engine when an engine automatic stop condition is established, and restarts the engine when an engine restart condition is established, and includes an inertially-rotating-restart-decision unit which permits or prohibits a restart of the engine, which is inertially rotating after the engine is automatically stopped, in accordance with a detection result of an oil temperature of the engine.

2 Claims, 8 Drawing Sheets

(52) U.S. Cl.
CPC ......... *F02N 11/0851* (2013.01); *F02N 15/067* (2013.01); *F02N 2200/022* (2013.01); *F02N 2200/023* (2013.01); *F02N 2200/024* (2013.01); *F02N 2300/2002* (2013.01); *Y02T 10/48* (2013.01)

(56) References Cited

FOREIGN PATENT DOCUMENTS

| | | | |
|---|---|---|---|
| JP | 2007-231838 A | | 9/2007 |
| JP | 2007231838 A | * | 9/2007 |
| JP | 2010-230008 A | | 10/2010 |
| JP | 2011-74912 A | | 4/2011 |
| JP | 2012-36747 A | | 2/2012 |
| JP | 2013-7307 A | | 1/2013 |
| WO | 2013/031432 A1 | | 3/2013 |

OTHER PUBLICATIONS

International Search Report for PCT/JP2013/074376 dated Oct. 8, 2013 [PCT/ISA/210].

Communication dated Oct. 10, 2016, issued by the State Intellectual Property Office of the P.R.C. in corresponding Chinese Application No. 201380079464.X.

Communication dated Apr. 28, 2017, from the State Intellectual Property Office of the P.R.C., in counterpart Chinese application No. 201380079464.X.

* cited by examiner

ENGINE AUTOMATIC STOP/RESTART DEVICE

BACKGROUND OF THE INVENTION

Technical Field

The present invention relates to an engine automatic stop/restart device which automatically stops an engine when a predetermined engine automatic stop condition is established, and then restarts the engine when a restart condition is established.

Background Art

In a conventional art, in order to improve fuel efficiency of a vehicle or to reduce an environment load, there is a developed engine automatic stop/restart system, so-called an idling stop control system, in which an engine is automatically stopped when a predetermined condition for stopping an engine, for example, a brake-on operation or the like in a state where a vehicle speed is lower than a predetermined value, is established by an operation of a driver, and the engine is automatically restarted when a predetermined condition for restarting the engine, for example, a brake-release operation or an accelerator-press operation, is established by an operation of the driver.

In the conventional idling stop control system, just after an automatic stop requirement is caused, fuel is cut, whereby a restart requirement is caused at a halfway process in which an engine revolution number is decreased. However, in this case, when an engine is cranked and restarted by energizing a starter after the engine is completely stopped, a long time is required after an automatic stop requirement is caused until the engine is completely restarted, so that there is a case in which a driver feels a delay time (time lag) of a restarting operation.

Therefore, there is a developed technology in which a ring gear and a pinion gear are engaged so as to restart an engine when an engagement-permission condition of the ring gear and the pinion gear is established and an engine-restart condition is established at a halfway process in which an engine revolution number is decreased by a fuel cut operation of an idling-stop control (for example, refer to Patent Document 1).

In the conventional device which is disclosed in Patent Document 1, when an engine revolution number Ne is higher than a second predetermined revolution number, an engagement-prohibition condition is not established. Moreover, when the engine revolution number Ne is lower than or equal to a first predetermined revolution number and an engagement-permission condition is established, it is judged that a revolution number for engaging the ring gear and the pinion gear is set within a defined revolution number difference range (−150 rpm~150 rpm), and a solenoid is energized by a start control means, and the pinion gear is pushed, and an impact, which is caused when the ring gear and the pinion gear are engaged, is reduced, whereby a restart operation of the engine, which is idling, in an automatic idling stop system can be immediately and quietly performed.

In this case, the second predetermined revolution number is defined as an engine revolution number at a timing which is backed in a delay time Td, which is a time after the solenoid is energized until the engagement of the gears is completed, from a time when the engine revolution number is equal to the engagement-allowable-range-lower-limit revolution number, and the first predetermined revolution number is defined as an engine revolution number at a timing which is backed in the delay time Td, which is the time after the solenoid is energized until the engagement of the gears is completed, from a time when the engine revolution number is equal to the engagement-allowable-range-upper-limit revolution number.

CONVENTIONAL ART DOCUMENT

Patent Document

Patent Document 1: International Publication No. WO/2013/031432A1

SUMMARY OF THE INVENTION

Problems to be Solved by the Invention

However, in a conventional engine automatic stop/restart device in which the above-described technology, which is disclosed in Patent Document 1, is applied, there have been problems which are described below. FIG. 9 is a timing chart for explaining the problems of the conventional engine automatic stop/restart device in which the technology, which is disclosed in Patent Document 1, is applied. In FIG. 9, a waveform "A", which is indicated by a solid line, is an engine inertial rotation operation in a case where an engine oil temperature is sufficiently high, for example, 60° C., and a waveform "B", which is indicated by a dashed line, is an engine inertial rotation operation in a case where an engine oil temperature is low, for example, 40° C. In FIG. 9, Td is a delay time after a solenoid is energized until an engagement of the gears is completed, and N1 represents a first predetermined revolution number (engagement-permission revolution number), and N2 represents a second predetermined revolution number (engagement-prohibition revolution number).

As indicated by the solid line waveform "A", when the engine oil temperature is sufficiently high, an engagement-permission condition is established at a time t1, and energization for a solenoid is started, and a pinion gear is moved, and an engine revolution number, at a time t2 when the pinion gear is engaged to a ring gear, is set within an allowable range. In this case in FIG. 9, X1 indicates an upper-limit revolution number within an engagement allowable range, and X2 indicates a lower-limit revolution number within the engagement allowable range.

On the other hand, as indicated by the dashed line waveform "B", when the engine oil temperature is low, the consistency of the engine oil is high, so that a friction, which is acted to the engine, is increased. As a result, a revolution number of the engine, which is inertially rotating, is quickly varied in comparison with a time when the engine oil temperature is high, so that a variation value of the engine revolution number is increased at the delay time Td. As a result, the engagement-permission condition is established at a time t1', and the energization for the solenoid is started, and the pinion gear is moved, and the engine revolution number, at a time t2' when the pinion gear is engaged to a ring gear, is exceeded over an allowable range, so that there have been problems in that a noise is caused when the both gears are engaged, and an impact torque is increased, whereby the both gears are worn out or broken.

Moreover, in a general engine automatic stop/restart device, when an engine water temperature is higher than an engine-automatic-stop-permission water temperature, it is permitted that the engine is automatically stopped, and when the engine water temperature is lower than or equal to the engine-automatic-stop-permission water temperature, it is not permitted that the engine is automatically stopped. Therefore, when a problem, which is caused in an engine automatic stop/restart device in which the technology disclosed in Patent Document 1 is applied, is considered, the engine-automatic-stop-permission water temperature is defined as a high temperature, for example, a temperature which is higher than or equal to 60° C., whereby it can be avoided that a pinion gear and a ring gear are engaged at an outside of an allowable range.

On the other hand, when it is only considered that a restart performance is maintained after the engine is completely stopped and an exhaust-gas-clarification performance is maintained, the engine-automatic-stop-permission water temperature can be defined as a relatively lower temperature, for example, a temperature which is higher than or equal to 40° C. Therefore, in this case, although it can be avoided that the gears are engaged at the outside of the allowable range, the engine cannot be automatically stopped when the water temperature is lower than 60° C., so that the fuel economy performance (consumption-fuel-decrement value) is sacrificed.

The present invention has been made to solve the above-described problems in a conventional engine automatic stop/restart device, and object of the invention is to provide an engine automatic stop/restart device in which a fuel economy performance is not sacrificed even when an engine oil temperature is low in a case where an engine, which is inertially rotating after the engine is automatically stopped, is restarted, and it can be avoided that a noise is caused when a pinion gear and a ring gear are engaged, and damage is caused in the both gears.

Means for Solving Problems

An engine automatic stop/restart device, which automatically stops an engine when an automatic stop condition of the engine is established, and restarts the engine when a restart condition of the engine is established, includes a ring gear which is linked to a crank shaft of the engine; a starter motor which is energized so as to be rotated; a pinion gear which transmits a rotation of the starter motor to the ring gear; a pinion gear movement unit which is energized so as to move the pinion gear in a direction of the ring gear, whereby the pinion gear is engaged to the ring gear; and an inertially-rotating-restart-decision unit which permits or prohibits a restart of the engine, which is inertially rotating after the engine is automatically stopped, in accordance with a detection result of an oil temperature of the engine or a water temperature of the engine.

Effects of the Invention

According to an engine automatic stop/restart device of the present invention, when an engine, which is inertially rotating, is restarted, and an engine oil temperature or an engine water temperature is low, and friction of the engine is increased in comparison with friction at a time when the engine oil temperature or the engine water temperature is high, and an engine revolution number is greatly varied when the engine is inertially rotating, a restart of the engine, which is inertially rotating, is prohibited, whereby it can be avoided that a noise is caused when gears are engaged, or damage is caused in a starter device. Moreover, in this case, when the restart of the engine is prohibited, and an inertial rotation of the engine is terminated, and it can be judged that the engine is stopped or operated just before the engine is stopped, prohibition of the restart of the engine is released, whereby the engine can be certainly restarted without sacrificing a fuel economy performance.

MODE FOR CARRYING OUT THE INVENTION

Embodiment 1

Figure 1:
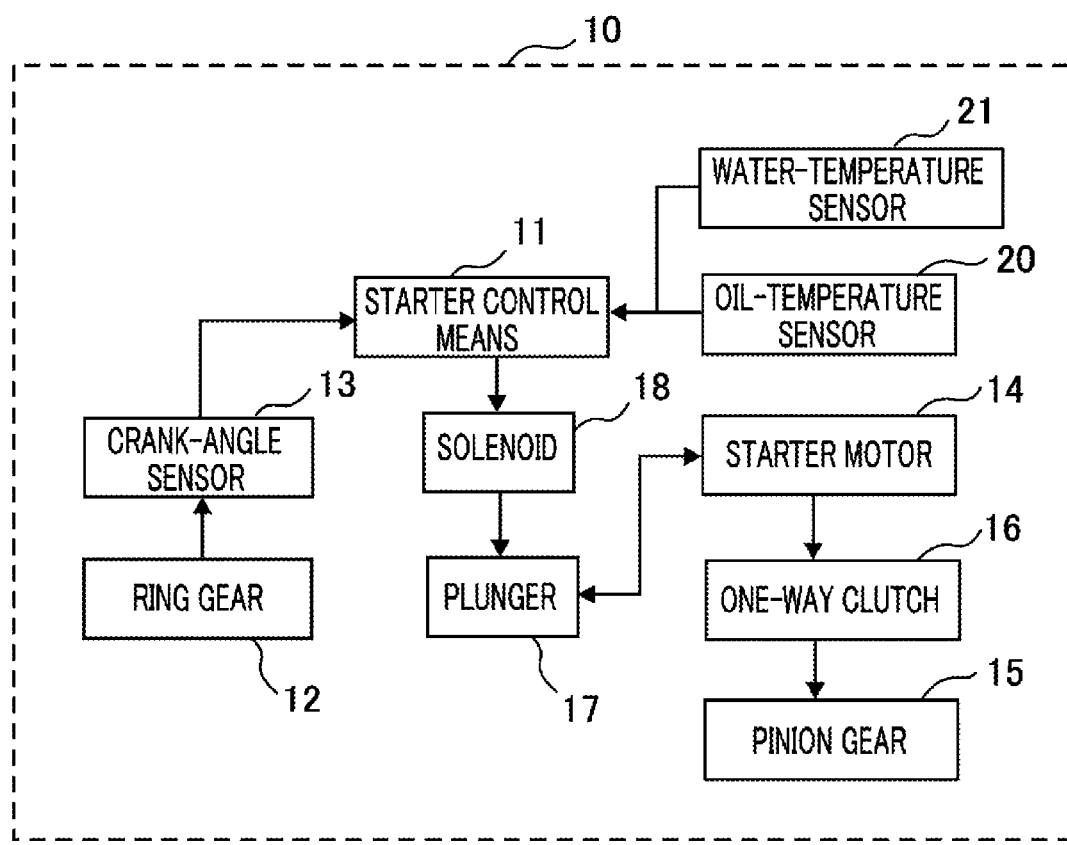
FIG. 1 is a block diagram illustrating a schematic configuration of an engine automatic stop/restart device according to Embodiment 1 of the present invention.
Figure 2:
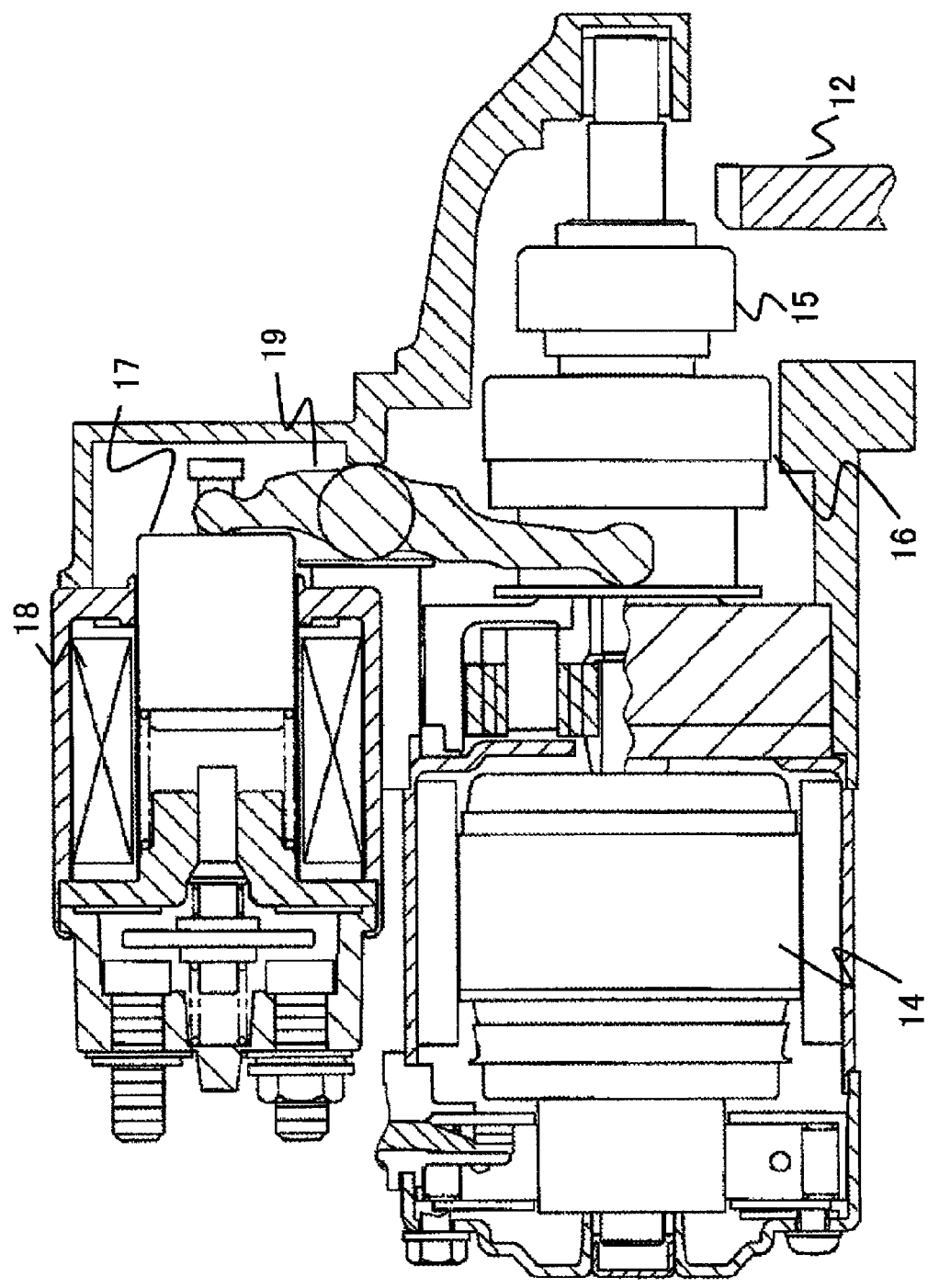
FIG. 2 is a partially-cut front view illustrating a starter of the engine automatic stop/restart device according to Embodiment 1 of the present invention.

Hereinafter, an engine automatic stop/restart device according to Embodiment 1 of the present invention will be minutely explained in reference to drawings. FIG. 1 is a block diagram illustrating a schematic configuration of an engine automatic stop/restart device according to Embodiment 1 of the present invention, and FIG. 2 is a partially-cut front view illustrating a starter of the engine automatic stop/restart device according to Embodiment 1 of the present invention. In FIG. 1 and FIG. 2, an engine automatic stop/restart device 10 includes a starter control means 11, a ring gear 12, a crank-angle sensor 13, a starter motor 14, a pinion gear 15, a one-way clutch 16, a plunger 17, and a solenoid 18.

The starter control means 11 controls energization of the solenoid 18. When the solenoid 18 is energized, the plunger 17 is aspirated, and the pinion gear 15 is moved via a lever 19 (refer to FIG. 2), whereby the pinion gear 15 is engaged to the ring gear 12. Moreover, a contact is closed when the plunger 17 is moved, and the starter motor 14 is energized, whereby the pinion gear 15 is rotated.

The ring gear 12 is engaged to the pinion gear 15, whereby a driving force of the starter motor 14 is transmitted to an engine. The crank-angle sensor 13 detects a crank angle of the engine. The one-way clutch 16 is linked to an output shaft of the starter motor 14, and the one-way clutch 16 is idled when a torque is inputted from the ring gear 12.

Moreover, the starter control means 11 can calculate an engine revolution number in reference to a rotation pulse period of a crank shaft, which is outputted from the crank-angle sensor 13. Moreover, an oil temperature of the engine can be detected by an engine-oil-temperature sensor 20, and a water temperature of the engine can be detected by an engine-water-temperature sensor 21.

When a vehicle is running and automatic stop conditions are established, in a state where, for example, a water temperature of the engine is higher than or equal to 60° C., and a vehicle speed is lower than or equal to 15 Km/h, and a driver presses a brake pedal, a fuel supply to the engine is stopped. As a result, the engine revolution number is decreased in an inertial operation.

Figure 3:
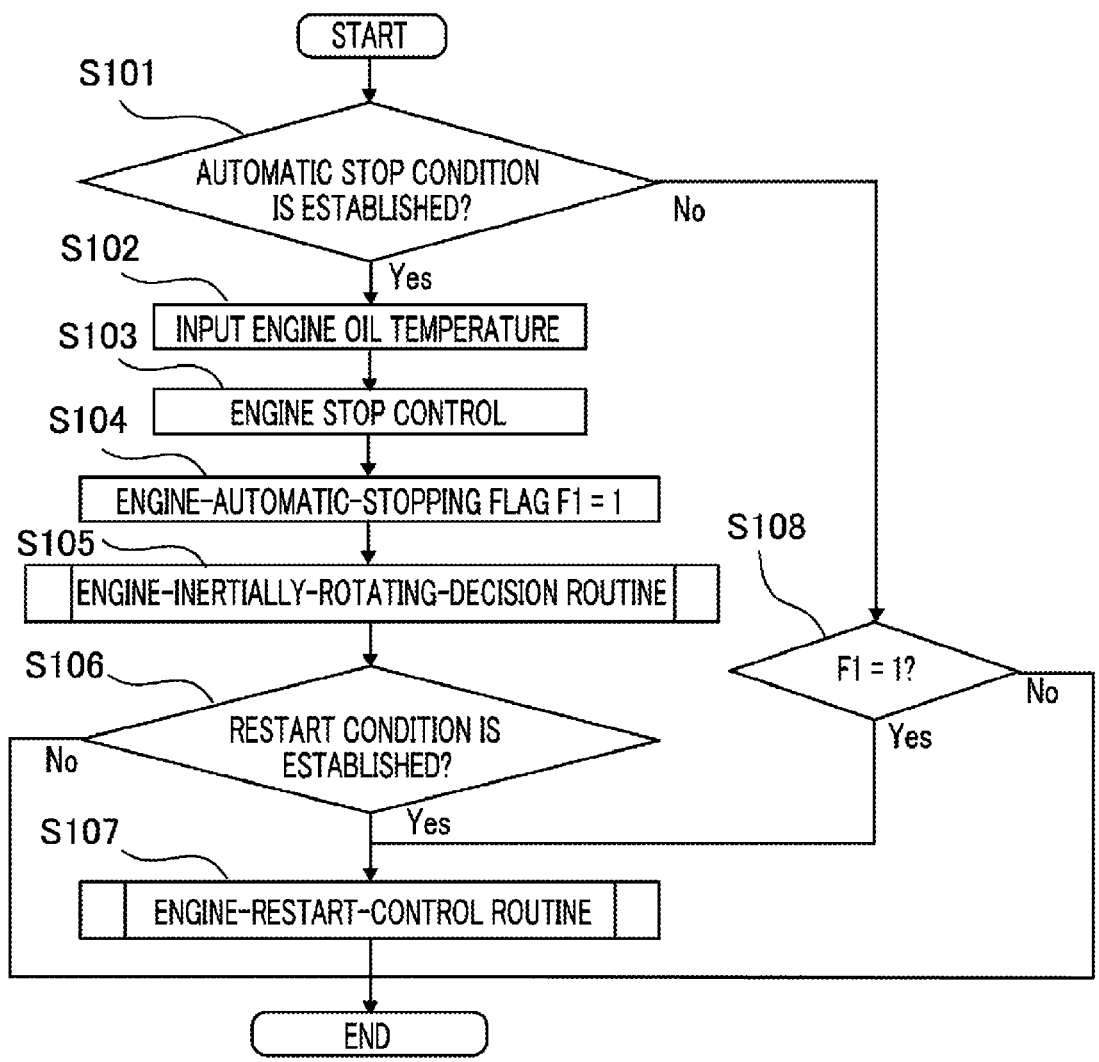
FIG. 3 is a flowchart illustrating a sequential process in the engine automatic stop/restart device according to Embodiment 1 of the present invention.

Hereinafter, a specific operation of the automatic stop/restart device according to Embodiment 1 of the present invention will be explained. FIG. 3 is a flowchart illustrating a sequential process in the engine automatic stop/restart device according to Embodiment 1 of the present invention. Firstly, at step S101 in FIG. 3, the starter control means 11 judges whether an engine automatic stop condition is established or not. When it is judged at step S101 that the engine automatic stop condition is not established (No), the process proceeds to step S108, and the starter control means 11 judges whether an engine-automatic-stopping flag F1, which is described below, is set as "1" or not. When the flag F1 is set as "1" (Yes), the process proceeds to step S107, and when the flag F1 is not set as "1", in other words, when the flag F1 is set as "0" (No), the process is terminated, and then the process proceeds to a next control cycle.

On the other hand, when it is judged at step S101 that the engine automatic stop condition is established (Yes), the process proceeds to step S102, and the oil temperature of the engine is inputted, and then the process proceeds to step S103. At step S103, a fuel supply to the engine is stopped in accordance with an engine stop control process, and the engine revolution number is decreased in an inertial operation.

Next, at step S104, an engine-automatic-stopping flag F1 is set as "1", and the process proceeds to step S105. Moreover, the engine-automatic-stopping flag F1 is reset as "0" at the timing when an engine restart operation is completed.

Figure 4:
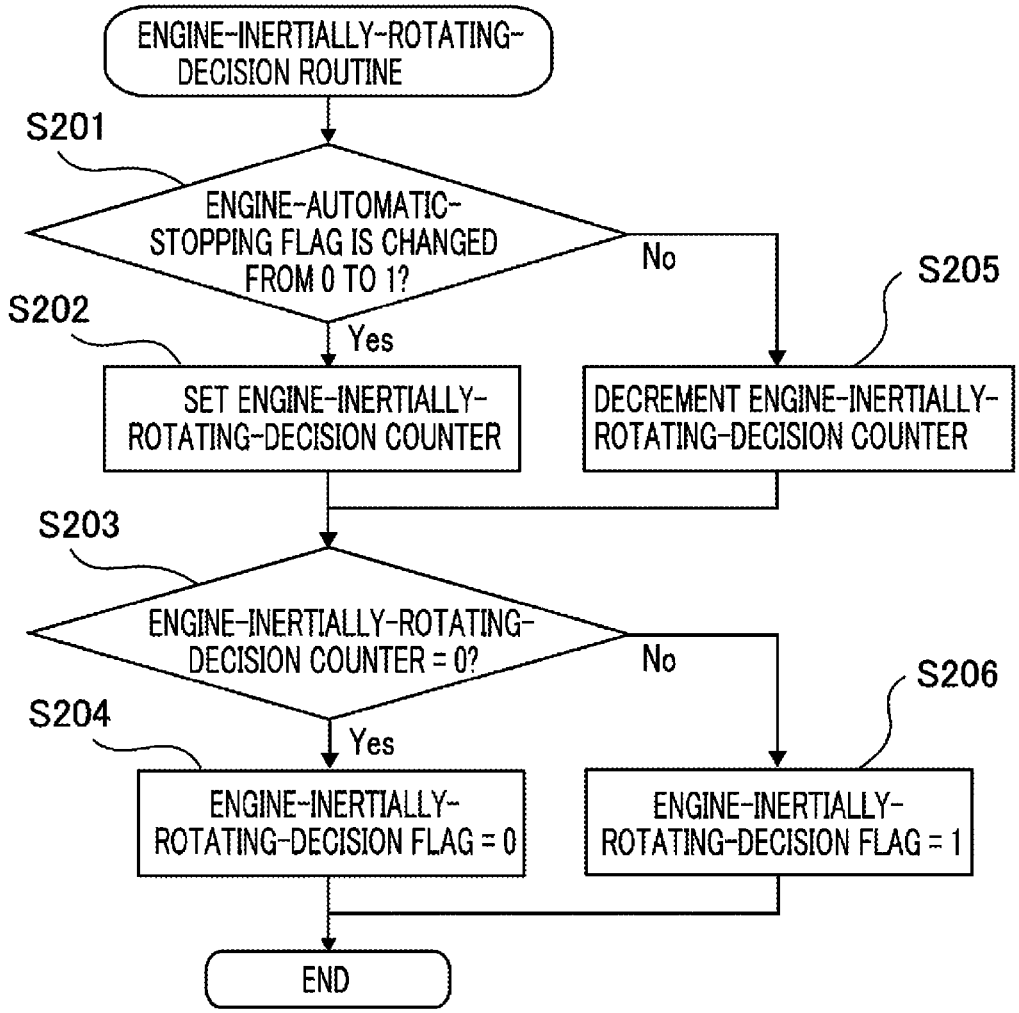
FIG. 4 is a flowchart illustrating a sequential process, which is related to a decision whether an engine is inertially rotating or not, in the engine automatic stop/restart device according to Embodiment 1 of the present invention.

Next, at step S105, it is judged whether the engine is inertially rotating or not. FIG. 4 is a flowchart illustrating a sequential process, which is related to a decision whether the engine is inertially rotating or not, in the engine automatic stop/restart device according to Embodiment 1 of the present invention. Hereinafter, an engine-inertially-rotating-decision routine, which is indicated in step S105 in FIG. 3, will be minutely explained in reference to FIG. 4. Firstly, at step S201 in FIG. 4, it is judged whether the engine-automatic-stopping flag F1, which is set at step S104 in FIG. 3, is changed from "0" to "1". When the engine-automatic-stopping flag F1 is changed from "0" to "1" (Yes), the process proceeds to step S202, and an engine-inertially-rotating-decision counter is set as a predetermined value which is described below. Next, the process proceeds to step S203.

On the other hand, as a judgement result at step S201, when the engine-automatic-stopping flag F1, which is set at step S104 in FIG. 3, is not changed from "0" to "1" (No), the process proceeds to step S205, and the engine-inertially-rotating-decision counter is decremented, and then the process proceeds to step S203. The engine-inertially-rotating-decision counter is determined in reference to a control map in which an engine revolution number, at a time when the engine is automatically stopped, and the engine oil temperature, which is inputted at step S102 in FIG. 3, are used as parameters.

Figure 8:
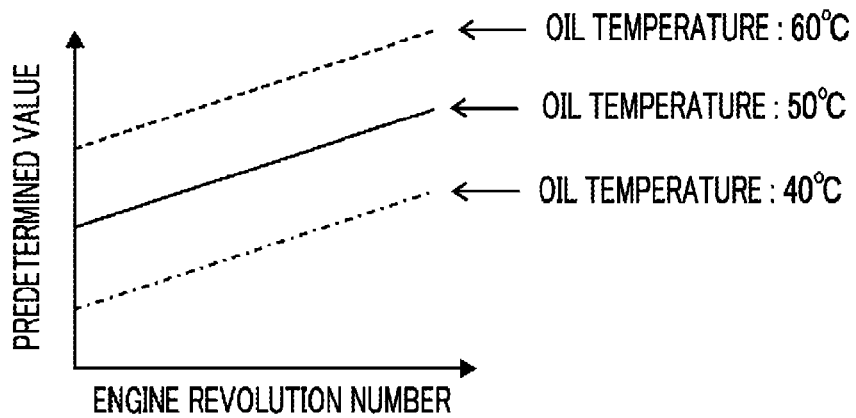
FIG. 8 is a map for determining a predetermined value of an engine-inertially-rotating-decision counter in the engine automatic stop/restart device according to Embodiment 1 of the present invention.
Figure 9:
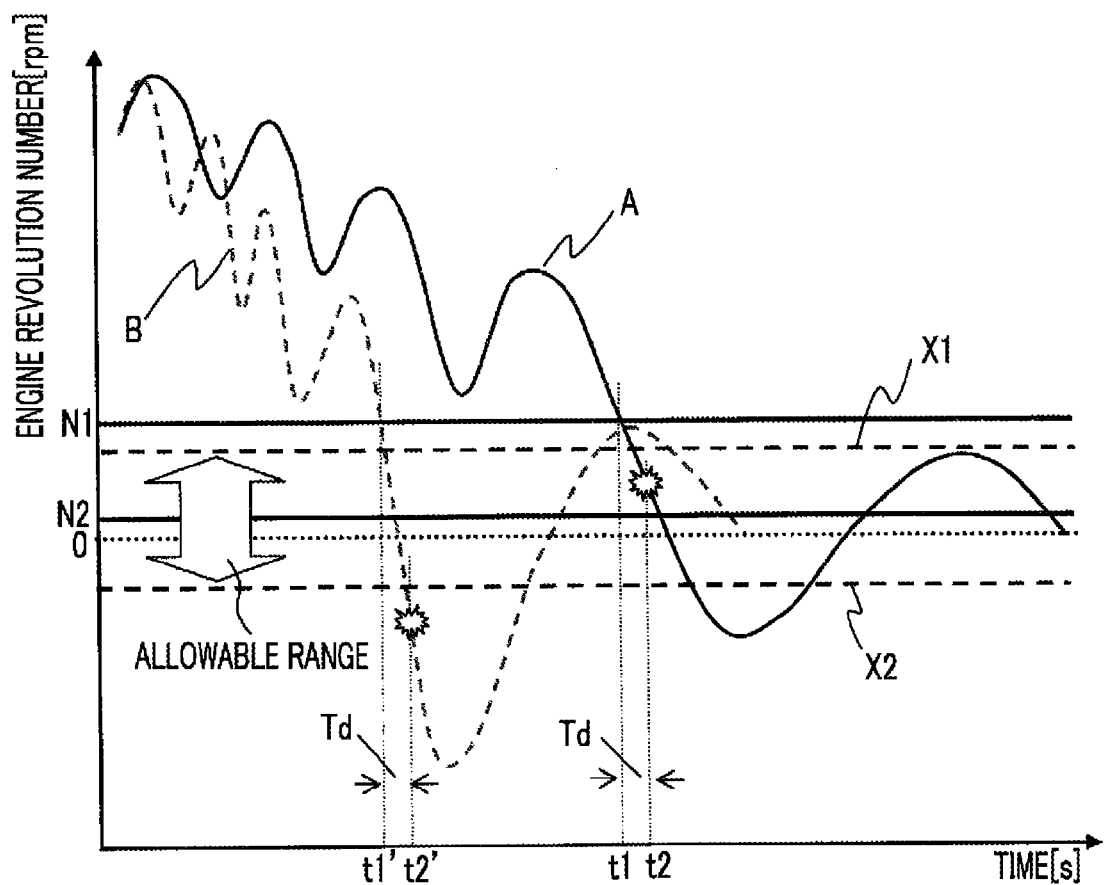
FIG. 9 is a timing chart for explaining a problem in a case where a conventional technology is applied to an engine automatic stop/restart device.

In other words, the predetermined value of the engine-inertially-rotating-decision counter, which is set at the above-described step S202, represents a time after the engine is automatically stopped until the engine is completely stopped, and the predetermined value is determined, in reference to an engine revolution number, at a time when the engine is automatically stopped, and an engine oil temperature, based on a map which is previously memorized in the engine automatic stop/restart device 10. FIG. 8 is a map for determining a predetermined value of the engine-inertially-rotating-decision counter in the engine automatic stop/restart device according to Embodiment 1 of the present invention, and FIG. 8 indicates an example of the map which is previously memorized in the engine automatic stop/restart device 10.

In FIG. 8, a X-axis indicates an engine revolution number at a time when the engine is automatically stopped, and a Y-axis indicates a predetermined value which is set at an arbitrary engine oil temperature (for example, 40° C., 50° C., 60° C., or 80° C.). The predetermined value is calculated in accordance with the engine revolution number, at a time when the engine is automatically stopped, and the engine oil temperature. Moreover, when the engine revolution number, at a time when the engine is automatically stopped, is increased, it is considered that a long time is required until the engine is completely stopped, so that it is defined that the predetermined time is increased. Moreover, when the engine oil temperature is decreased, it is considered that the friction of the engine is increased, whereby the engine is promptly and completely stopped, so that it is defined that the predetermined time is decreased. Therefore, an optimum predetermined value corresponding to the engine revolution number, at a time when the engine is automatically stopped, and the engine oil temperature, in other words, a time after the engine is automatically stopped until the engine is completely stopped, can be set based on the map which is indicated in FIG. 8.

Moreover, the above-described predetermined value can be obtained in reference to a measurement result, which is measured in the actual device, of an elapsed time after the engine is automatically stopped just before the engine is stopped or until the engine is completely stopped at an arbitrary engine revolution number and the engine oil temperature (for example, 40° C., 50° C., 60° C., or 80° C.).

Next, at step S203 in FIG. 4, it is judged whether the engine-inertially-rotating-decision counter is set as "0" or not. When the engine-inertially-rotating-decision counter is set as "0" (Yes), the process proceeds to step S204, and an engine-inertially-rotating-decision flag is reset as "0", and then the process is returned to the flowchart in FIG. 4. Moreover, when the engine-inertially-rotating-decision counter is not set as "0" (No) (in other words, when the engine-inertially-rotating-decision counter is set as "1"), the process proceeds to step S206, and the engine-inertially-rotating-decision flag is set as "1", and then the process is returned to the flowchart in FIG. 4.

Next, at step S106 in FIG. 3, it is judged whether a restart condition is established or not. When it is judged that the restart condition is established, the process proceeds to step S107, and an engine-restart-control process is performed. On the other hand, when it is judged that the restart condition is not established, the process is terminated, and then the process proceeds to a next control cycle.

Figure 5:
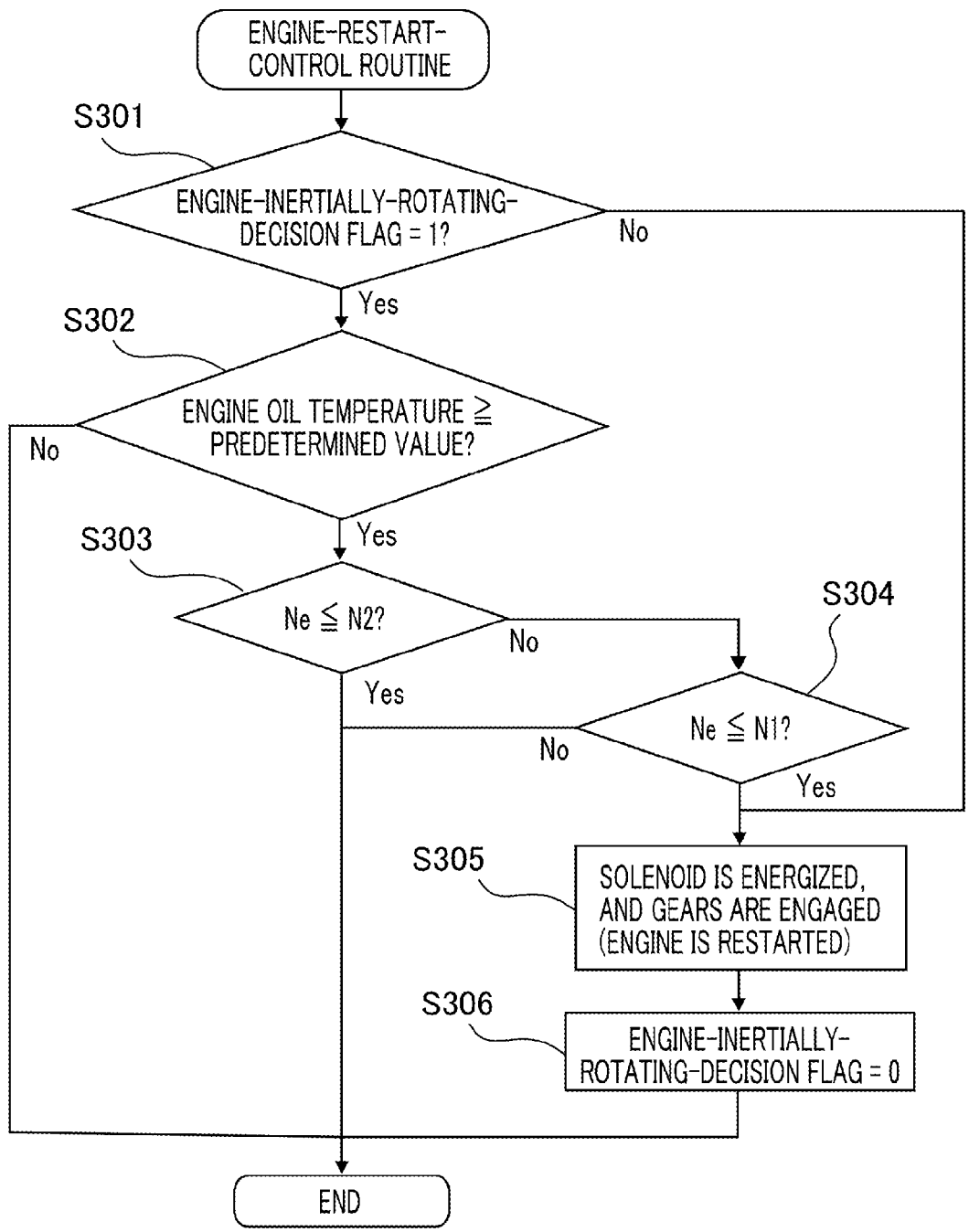
FIG. 5 is a flowchart illustrating a sequential process, at a time when an engine restart condition is established, in the engine automatic stop/restart device according to Embodiment 1 of the present invention.

Hereinafter, an engine-restart-control routine, which is indicated in step S107, will be minutely explained. FIG. 5 is a flowchart illustrating a sequential process, at a time when an engine restart condition is established, in the engine automatic stop/restart device according to Embodiment 1 of the present invention. Firstly, at step S301 in FIG. 5, when the engine-inertially-rotating-decision flag, which is set in the above-described step S105, is set as "1" (Yes), it is judged that the engine is inertially rotating, and the process proceeds to step S302. On the other hand, when the engine-inertially-rotating-decision flag is set as "0" (No), it is judged that the engine is completely stopped or operated just before the engine is stopped, and the process proceeds to step S305, and the solenoid 18 is energized, and the pinion gear 15 and the ring gear 12 are engaged, whereby the engine is restarted.

In this case, at step S301, although it is judged, by using the engine-inertially-rotating-decision flag which is set in step S105, whether the engine is inertially rotating or not, a general method, which judges that the engine is completely stopped or operated just before the engine is stopped, may be used. In particular, when a pulse of a crank angle is not detected within a predetermined time (for example, 300 ms) after the engine is automatically stopped, it may be judged that the engine is completely stopped or operated just before the engine is stopped.

Next, at step S302, an engine oil temperature Te, which is inputted at step S102, is compared with a predetermined value Tcom, which is previously memorized in the engine automatic stop/restart device 10. When the engine oil temperature Te is higher than or equal to the predetermined value Tcom (Yes), the pinion gear 15 and the ring gear 12 are engaged within an allowable range, and the process proceeds to step S303 in order to restart the engine. In other words, it is permitted that the engine, which is inertially rotating, is restarted.

On the other hand, as a judgement result at step S302, when the engine oil temperature Te is lower than the predetermined value Tcom (No), the friction of the engine is increased. As a result, when the engine is restarted, a variation of the engine revolution number, which is caused during a delay time Td after the solenoid 18 is energized until the engagement of the gears is completed, is greater than an estimated value, and it is judged that the pinion gear 15 and the ring gear 12 are not easily engaged within an allowable range, so that the solenoid 18 is not energized, and the process is terminated. In other words, it is prohibited that the engine, which is inertially rotating, is restarted.

As described above, a process routine in step S302 composes an inertially-rotating-restart-decision unit which permits or prohibits a restart of the engine, which is inertially rotating after the engine is automatically stopped, in accordance with a detection result of the oil temperature of the engine or the water temperature of the engine.

In addition, in the actual device, the engine revolution number is measured in a case where the oil temperature is variously changed and the pinion gear 15 and the ring gear 12 are engaged, and the predetermined value can be set in accordance with the measured result and the allowable range of the engagement of the pinion gear 15 and the ring gear 12. For example, in a three-cylinder engine of which displacement is 660 cc, the predetermined value can be set as 50° C.

Hereinafter, the engagement of the pinion gear 15 and the ring gear 12 is explained before the next processes of step S303 are explained. In a case where a revolution number of the pinion gear 15 is greatly different from a revolution number of the ring gear 12, an impact and a noise are caused when the gears are engaged, so that it is required the pinion gear 15 and the ring gear 12 are engaged within a revolution number difference range (−150 rpm~150 rpm) which is defined in accordance with an engagement-allowable-range-upper-limit revolution number (for example, 150 rpm) and an engagement-allowable-range-lower-limit revolution number (for example, −150 rpm).

Next, at step S303, an engine revolution number Ne is compared with a second predetermined revolution number N2. When the engine revolution number Ne is lower than or equal to the second revolution number N2 (Yes), the solenoid 18 is not energized, and the process is terminated, and when the engine revolution number Ne is higher than the second predetermined revolution number N2 (No), the process proceeds to step S304.

In this case, the second predetermined revolution number N2 is defined by considering a delay time Td (for example, 10 ms), which is a time after the solenoid 18 is energized until the engagement of the gears is completed, in a state where the solenoid 18 is energized and the pinion gear 15 is engaged to the ring gear 12. In particular, when the engine oil temperature is sufficiently high (for example, 60° C.), the second revolution number N2 is defined as an engine revolution number at a timing which is backed in the delay time Td from a time when the engine revolution number Ne is equal to the engagement-allowable-range-lower-limit revolution number.

Therefore, in a case where the engine revolution number Ne is lower than or equal to the second predetermined revolution number N2 and it is started that the solenoid 18 is energized, when the gears are engaged after the delay time Td elapses, the engine revolution number is lower than the engagement-allowable-range-lower-limit revolution number, and an impact and a noise are caused when the gears are engaged, so that the engine revolution number Ne is compared with the second predetermined revolution number N2 at step S303. When the engine revolution number Ne is lower than or equal to the second predetermined revolution number N2 (Yes), the solenoid 18 is not energized, and the process is terminated.

Moreover, in a case where the engine revolution number Ne is higher than the second predetermined revolution number N2 and the solenoid 18 is energized, when the gears are engaged after the delay time Td elapses, the engine revolution number is higher than or equal to the engagement-allowable-range-lower-limit revolution number, and the gears can be smoothly engaged, so that the engine revolution number Ne is compared with the second predetermined revolution number N2 at step S303. When the engine revolution number Ne is higher than the second predetermined revolution number N2 (No), the process proceeds to step S304, and it is judged whether an engagement-permission condition is established or not.

At step S304, the engagement-permission condition is judged by checking that the engine revolution number Ne is lower than or equal to a first predetermined revolution number N1 (in this case, N1>N2). When it is judged that the engagement-permission condition (Ne≤N1) is established (Yes), the process proceeds to step S305, and the solenoid 18 is energized, and the pinion gear 15 is engaged to the ring gear 12, and the engine is restarted, and then the engine-inertially-rotating-decision flag is reset as "0".

In this case, the first predetermined revolution number N1 is defined by considering the engagement-allowable-range-upper-limit revolution number (for example, 150 rpm) and the delay time Td. In particular, when the engine oil temperature is sufficiently high (for example, 60° C.), the first predetermined revolution number N1 is defined as an engine revolution number at a timing which is backed in the delay time Td from a time when the engine revolution number Ne is equal to the engagement-allowable-range-upper-limit revolution number.

Moreover, at step S304, when the engine revolution number Ne is higher than the first predetermined revolution number N1 (No), the process is terminated.

Figure 6:
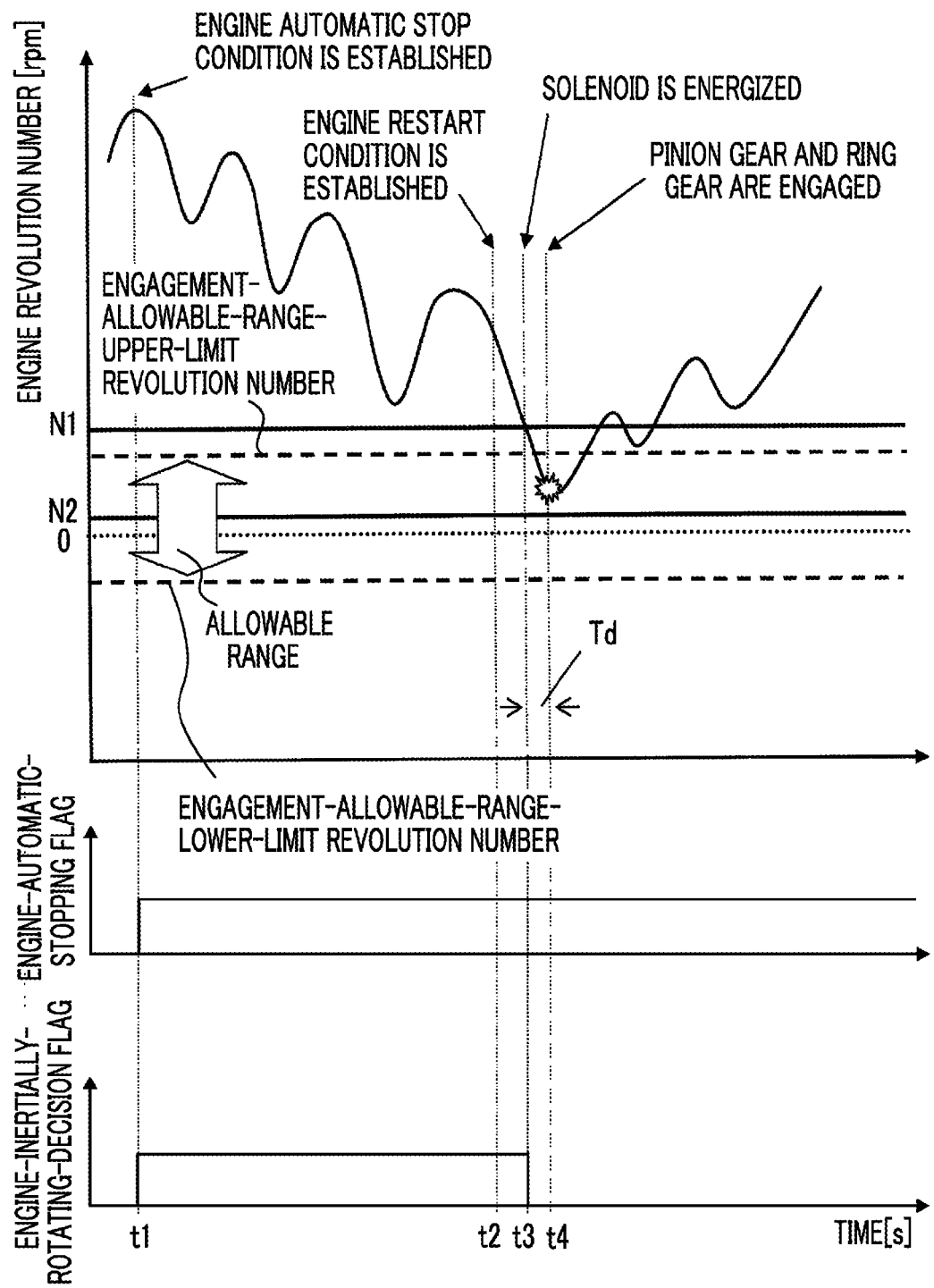
FIG. 6 is a timing chart illustrating an operation of the engine automatic stop/restart device according to Embodiment 1 of the present invention in a state where an engine oil temperature is high.
Figure 7:
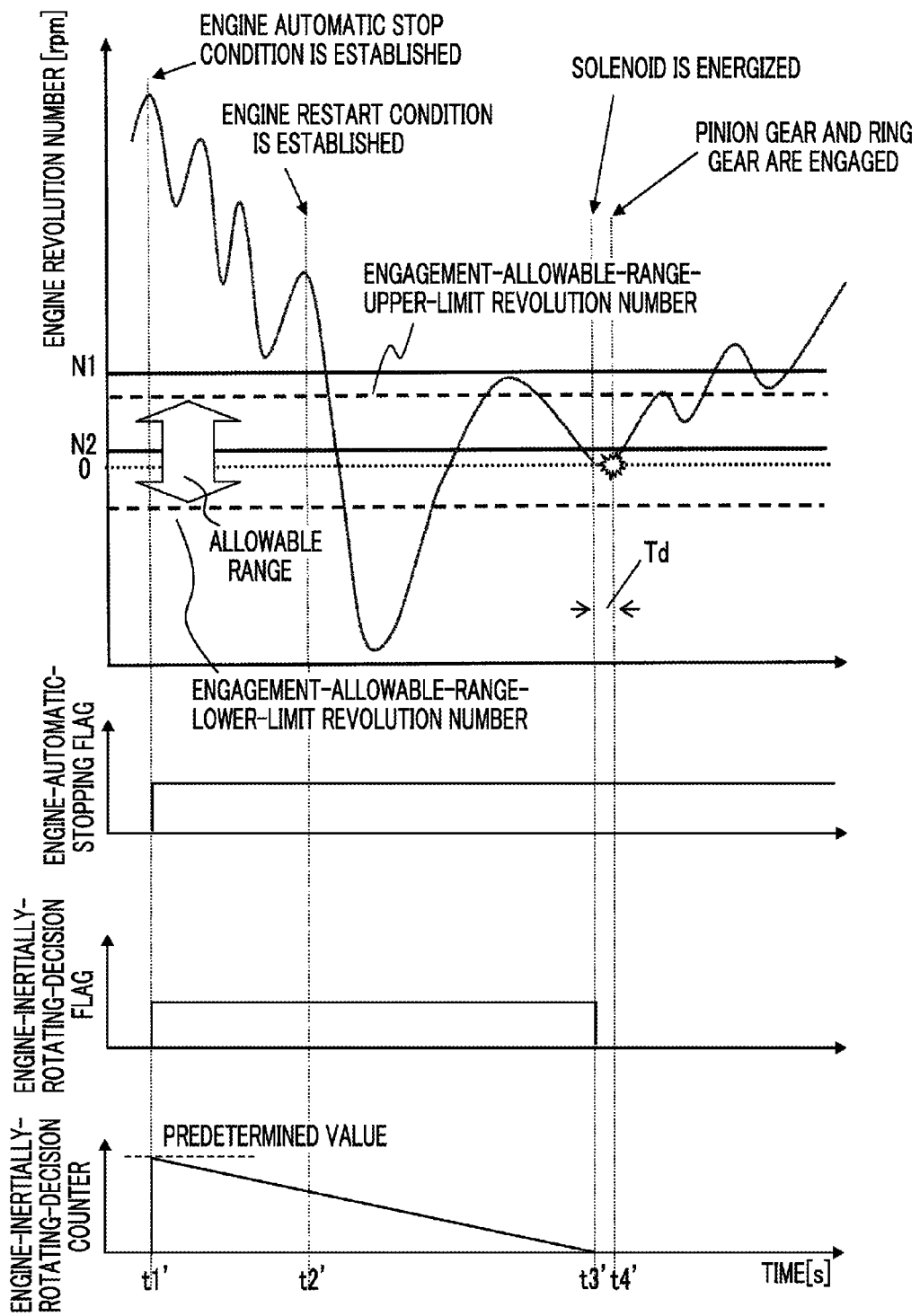
FIG. 7 is a timing chart illustrating an operation of the engine automatic stop/restart device according to Embodiment 1 of the present invention in a state where the engine oil temperature is low.

Hereinafter, an operation of the engine automatic stop/restart device according to Embodiment 1 of the present invention will be explained in reference to FIG. 6 and FIG. 7. FIG. 6 is a timing chart illustrating an operation of the engine automatic stop/restart device according to Embodiment 1 of the present invention in a state where an engine oil temperature is high, and FIG. 6 indicates an operation of the engine automatic stop/restart device in a state where the engine oil temperature is sufficiently high (for example, 60° C.). FIG. 7 is a timing chart illustrating an operation of the engine automatic stop/restart device according to Embodiment 1 of the present invention in a state where the engine oil temperature is low, and FIG. 7 indicates an operation of the engine automatic stop/restart device in a state where the engine oil temperature is low (for example, 40° C.).

Firstly, an operation will be explained in a case where the engine oil temperature is high, and the engine restart condition is established, and the engine is restarted (the pinion gear 15 and the ring gear 12 are engaged) when the engine is inertially rotating. In FIG. 6, the engine automatic stop condition is established at a time t1, and a fuel injection is stopped. In this case, the engine-automatic-stopping flag F1 is changed from "0" to "1", so that the engine-inertially-rotating-decision flag is set as "1".

Next, an engine restart condition (for example, a driver takes off his foot a brake pedal) is established at a time t2, and a process in the engine-restart-control routine (step S107 in FIG. 3) is started. In this case, the engine-inertially-rotating-decision flag is set as "1" (the engine restart condition is established when the engine is inertially rotating), and the engine oil temperature is higher than or equal to the predetermined oil temperature 60° C. in a state where it is permitted that the engine, which is inertially rotating, is restarted. However, the engine revolution number Ne is higher than the engagement-allowable-range-upper-limit revolution number N1 (No decision at step S304 in FIG. 5), so that the engine is not restarted.

Next, at a time t3 when the engine revolution number Ne is more decreased so as to be lower than or equal to the engagement-allowable-range-upper-limit revolution number N1 (Yes decision at step S304 in FIG. 5), the solenoid 18 is energized, and a gear engagement operation is started. Moreover, the gear engagement operation is completed at a time t4 after the delay time Td elapses, and the engine is restarted by a cranking operation. The engine revolution number at the time t4 is set within the engagement allowable range, so that the gears are quietly engaged, and damage is not caused in the device.

Next, an operation will be explained in a case where the engine oil temperature is low and the engine restart condition is established, and the engine is not restarted (the pinion gear 15 and the ring gear 12 are not engaged) when the engine is inertially rotating, and then the engine is restarted at a timing when the engine is completely stopped or at a timing just before the engine is stopped. In FIG. 7, the engine automatic stop condition is established at a time t1', and a fuel injection is stopped. In this case, the engine-automatic-stopping flag F1 is changed from "0" to "1", so that the engine-inertially-rotating-decision flag is set as "1", and the engine-inertially-rotating-decision counter is set as a predetermined value.

Next, an engine restart condition (for example, a driver takes off his foot a brake pedal) is established at a time t2', a process in the engine-restart-control routine (step S107 in FIG. 3) is started. In this case, although the engine-inertially-rotating-decision flag is set as "1" (the engine restart condition is established when the engine is inertially rotating), the engine oil temperature is lower than the predetermined oil temperature 60° C. in a state where it is permitted that the engine, which is inertially rotating, is restarted (No decision at step S302 in FIG. 5), so that the engine revolution number Ne is more decreased, and the solenoid 18 is not energized even when the engine revolution number Ne is lower than or equal to the engagement-allowable-range-upper-limit revolution number N1.

Next, at a time t3' when the engine revolution number Ne is more decreased, and the engine is reversely rotated, and the engine is completely stopped, the engine-inertially-rotating-decision counter, which is decremented after the time t1', is set as "0", and the engine-inertially-rotating-decision flag is set as "0" (No decision at step S301 in FIG. 5), and the solenoid 18 is energized, and a gear engagement operation is started. Moreover, at a time t4' after the delay time Td elapses, the gear engagement operation is completed, and the engine is restarted by a cranking operation. The engine is completely stopped or operated just before the engine is stopped at the time t4', so that the gears are quietly engaged in a similar way of a usual key-on starting, and damage is not caused in the device.

As described above, the engine automatic stop/restart device according to Embodiment 1 of the present invention automatically stops an engine when an automatic stop condition of the engine is established, and then restarts the engine when a restart condition of the engine is established. Moreover, the engine automatic stop/restart device includes a ring gear which is linked to a crank shaft of the engine, a starter motor which is energized so as to be rotated, a pinion gear which transmits a rotation of the starter motor to the ring gear, and a pinion gear movement unit which is energized so as to move the pinion gear in a direction of the ring gear, whereby the pinion gear is engaged to the ring gear. Moreover, the engine automatic stop/restart device permits the restart of the engine, which is inertially rotating after the engine is automatically stopped, when a detection result of the oil temperature of the engine is higher than or equal to a predetermined value, and prohibits the restart of the engine, which is inertially rotating after the engine is automatically stopped, when the detection result of the oil temperature of the engine is lower than the predetermined value, and releases prohibition of the restart of the engine after a predetermined time, which is defied in accordance with the engine revolution number and the engine oil temperature, elapses.

Thereby, when the engine, which is inertially rotating, is restarted, the engine oil temperature is low, and the friction of the engine is increased, so that the engine revolution number is greatly varied when the engine is inertially rotating. When it is judged that the ring gear 12 and the pinion gear 15 are not easily engaged within an allowable range, the restart operation (engagement operation) is prohibited, and after it is optimally judged, in reference to the engine oil temperature and the engine revolution number at a time when the engine is automatically stopped, that the engine is completely stopped or operated just before the engine is stopped, the ring gear 12 and the pinion gear 15 are engaged, and the engine is restarted. Therefore, a noise and an impact torque, which are caused when the ring gear 12 and the pinion gear 15 are engaged, can be reduced without reference to a condition of the engine oil temperature. Moreover, the prohibition of the restarting is released at an optimal timing corresponding to the engine oil temperature, so that the useless prohibition of the restarting can be avoided.

Moreover, in order to reduce the noise and the impact torque, which are caused when the ring gear 12 and the pinion gear 15 are engaged in a case where the engine oil temperature is low and the engine is inertially rotating, it is not required that the engine-automatic-stop-permission water temperature is increased, so that the fuel economy performance is not sacrificed.

In addition, in Embodiment 1, although the engine automatic stop/restart device judges the permission and the prohibition of the restarting of the engine, which is inertially rotating after the engine is automatically stopped, in accordance with the engine oil temperature, there is a constant correlation between the engine oil temperature and the engine water temperature, so that the engine automatic stop/restart device may judge the permission and the prohibition of the restarting of the engine in accordance with the engine water temperature.

In addition, in the scope of the present invention, it is possible that the embodiment is suitably modified or omitted.

INDUSTRIAL APPLICABILITY

The present invention can be applied in a field of an automobile industry in which an engine automatic stop/restart device is provided.

What is claimed is:

1. An engine automatic stop/restart device, which automatically stops an engine when an automatic stop condition of the engine is established, and restarts the engine when a restart condition of the engine is established, comprising:
a ring gear which is linked to a crank shaft of the engine;
a starter motor which is energized so as to be rotated;
a pinion gear which transmits a rotation of the starter motor to the ring gear;
a pinion gear movement unit which is energized so as to move the pinion gear in a direction of the ring gear, whereby the pinion gear is engaged to the ring gear; and
an inertially-rotating-restart-decision unit which permits or prohibits a restart of the engine while the engine is inertially rotating after the automatic stop condition of the engine is established, in accordance with a detection result of an oil temperature of the engine or a water temperature of the engine wherein the inertially-rotating-restart-decision unit permits the restart of the engine while the engine is inertially rotating, when the oil temperature of the engine or the water temperature of the engine is higher than or equal to a predetermined value which is previously set, and prohibits the restart of the engine while the engine is inertially rotating, when the oil temperature of the engine or the water temperature of the engine is lower than the predetermined value which is previously set, wherein when the restart of the engine is permitted while the engine is inertially rotating, the pinion gear movement unit is energized in the case that the engine revolution number is lower than or equal to the first predetermined revolution number and higher than the second predetermined revolution number lower than the first predetermined revolution number, wherein when a restart of the engine is prohibited while the engine is inertially rotating, the prohibition of the restart of the engine is removed to energize the pinion gear movement unit after predetermined time has passed after the engine is automatically stopped.

2. An engine automatic stop/restart device as recited in claim 1, wherein the predetermined time is set in accordance with the oil temperature of the engine or the water temperature of the engine.

* * * * *